INVENTOR.
WILLIAM B. MC LEAN

*INVENTOR.*
WILLIAM B. MC LEAN
BY
ATTORNEYS.

Nov. 9, 1965 W. B. McLEAN 3,216,674
PROPORTIONAL NAVIGATION SYSTEM FOR A SPINNING
BODY IN FREE SPACE
Filed June 8, 1959 5 Sheets-Sheet 3

INVENTOR.
WILLIAM B. MC LEAN
BY
*J. M. St. Amand*
ATTORNEYS.

INVENTOR.
WILLIAM B. MCLEAN
BY
ATTORNEYS.

INVENTOR.
WILLIAM B. MCLEAN
BY

*J. M. St. Amand*
ATTORNEYS.

United States Patent Office 3,216,674
Patented Nov. 9, 1965

3,216,674
PROPORTIONAL NAVIGATION SYSTEM FOR A
SPINNING BODY IN FREE SPACE
William B. McLean, China Lake, Calif., assignor of fifty
percent to Walter G. Finch, Baltimore, Md.
Filed June 8, 1959, Ser. No. 818,979
19 Claims. (Cl. 244—14)
(Granted under Title 35, U.S. Code (1952), sec. 266)

The invention herein described may be manufactured and used by or for the Government of the United States of America for governmental purposes without the payment of any royalties thereon or therefor.

The present invention relates to space vehicles and more particularly to an automatic and self-contained navigation system for a space vehicle spinning about its central axis as it travels in space.

The present device utilizes the properties of a spinning body in free space for proportional navigation thereof. A body spinning in free space has all the properties of a gyroscope, and therefore, by imparting a spin to a space vehicle assembly it can be made to perform like a gyroscope while traveling in free space. To achieve stable spin about a fixed geometrical axis in the body a nutation damper is required. By including, in the space vehicle assembly, a tracking system for detecting electromagnetic radiation with its optical axis coinciding with the spin axis of the vehicle and a variable thrust jet motor on the outer periphery of the spinning vehicle, the vehicle can be made to precess so as to always point its spin axis at a target body that is emitting electromagnetic radiation. To provide a collision course between the spinning vehicle assembly and the target body a second jet motor for producing lateral acceleration is provided whose thrust axis passes through the center of gravity of the spinning vehicle and is 90° around the periphery of the vehicle from the precessing jet motor. By controlling both jet motors with a single valve so that the pressure behind each jet is varied proportional to the target signal the vehicle can be made to travel a course which will result in a collision with the target body. This device can be made to operate in any environment, including the earth's atmosphere, in which the motion of the vehicle or body is controlled primarily by the jet motors. To achieve this condition, aerodynamic forces must be reduced to a minimum.

It is an object of the invention therefore to provide a self-contained navigation system for a vehicle traveling in space or in any environment where the relative motion of the vehicle is controlled primarily by the propulsion means contained therein.

It is another object of the invention to provide a new and useful vehicle for space travel having a self-contained guidance system therein which will automatically follow a collision course with a target body emitting electromagnetic radiations.

Still another object of the invention is to provide a device which utilizes the properties of a spinning body in free space for proportional navigation thereof.

A further object of the invention is to provide a vehicle which when having a spin imparted thereto will perform like a gyroscope while traveling in free space, and which contains tracking and propulsion means for following a collision course with a chosen target body that is emitting electromagnetic radiation.

A still further object of the invention is to provide a proportional navigation system for a space vehicle where the propulsion system is controlled by a target signal from a seeker contained in the vehicle.

Other objects and many of the attendant advantages of this invention will become readily appreciated as the same becomes better understood by reference to the following detailed description when considered in connection with the accompanying drawings wherein.

A body or space vehicle spinning in free space has all the properties of a gyroscope, and if provided with a nutation damper, such as disclosed in U.S. Patent 2,734,384, issued February 14, 1956, or in U.S. Patent application Serial Number 789,215, filed January 26, 1959 and now abandoned, for Spin-Axis Stabilized Space Vehicle Structure, the spinning vehicle will maintain a fixed orientation in space unless acted upon by some external force or forces. Such external forces may be provided by reaction forces produced by jet propulsion motors carried in the spinning space vehicle.

Referring now to the drawings, like numerals refer to like parts in each of the figures.

Figure 1:
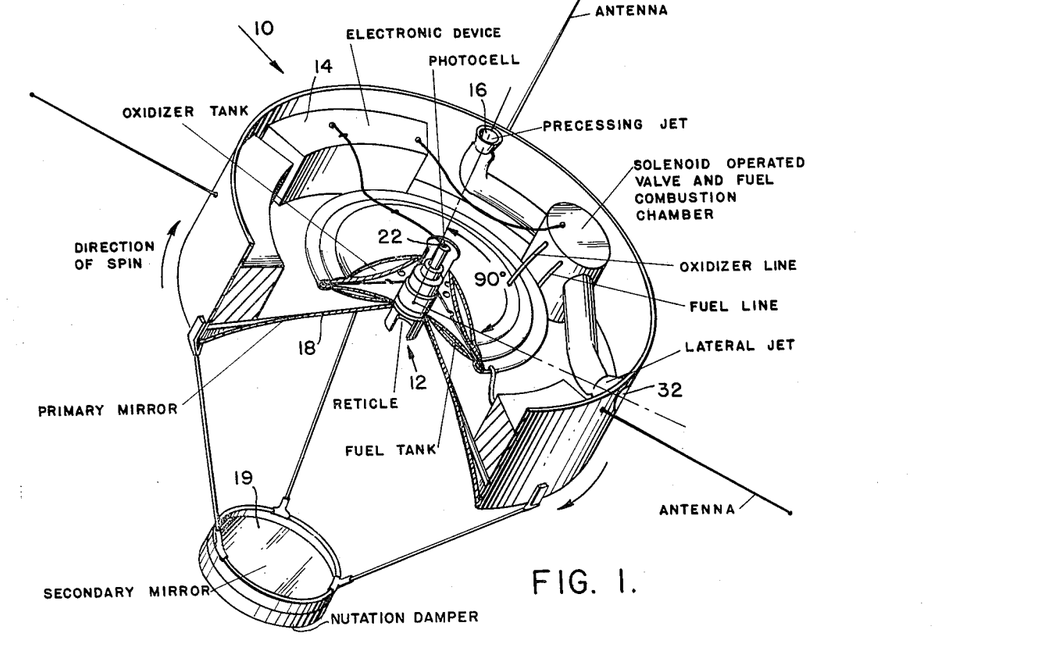
FIG. 1 is a perspective view of a preferred embodiment of the invention showing the interior of the vehicle.
Figure 2:
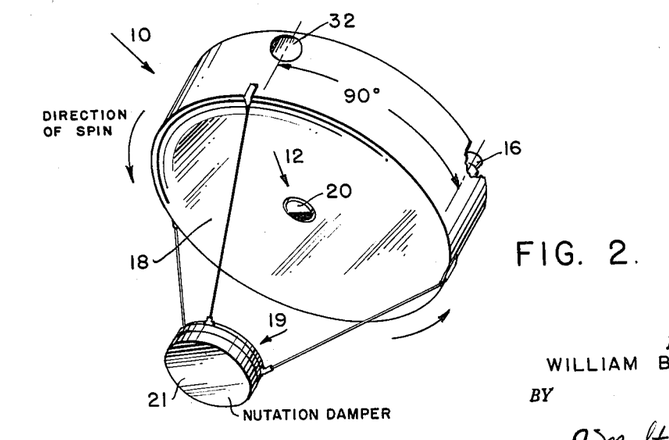
FIG. 2 is a perspective view of the vehicle of FIG. 1, showing the opposite side thereof.

The present invention is for navigating a space vehicle 10, illustrated in FIGS. 1 and 2, which is presumed to be traveling in space and spinning about its central axis, acting like and having all the properties of a gyroscope. The spin of the vehicle is usually imparted thereto at the time it is launched into space, but jet means can be provided in the vehicle itself for imparting the spin, if desired. A seeker 12, comprising a telescopic comparator mounted on the spin axis of the vehicle, detects electromagnetic (e.g., infrared) radiation from a target, such as the moon, a planet, or some other space vehicle, and generates a signal in accordance with the position or bearing of the target relative to the optical axis of the telescope which axis coincides with the spin axis of the vehicle. This signal is amplified and converted into an alternating current signal whose time of occurrence or phase is determined by the relation of the seeker to the target position. In direct response to the signals from the seeker a small jet motor 16 on the outer periphery of the spinning vehicle is caused to operate. By properly orienting this jet motor with respect to the seeker, as shown in FIGS. 1 and 2, the spinning vehicle 10, since it acts like a gyroscope, will be precessed in space in such a manner as to have its spin axis and thus the optical axis of the telescope point directly at a target which is imaged on the seeker 12. In this system the target signal generated by the seeker is not resolved into any coordinate system; the magnitude of the signal provides the magnitude of the correction signal. When accurate tracking is achieved the magnitude of the signal is proportional to the angular rate of the line joining the target and the seeker in space.

Figure 3:
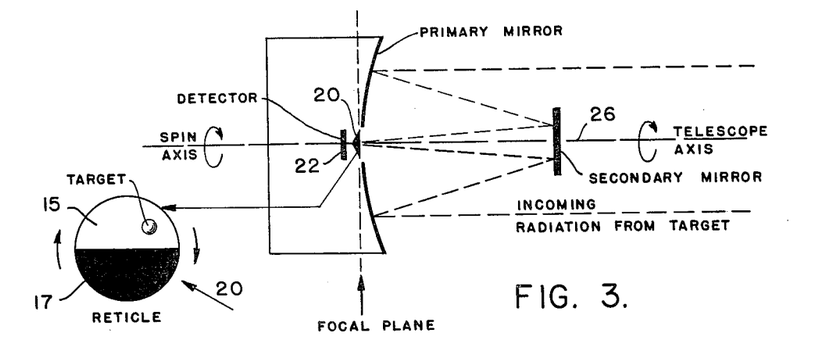
FIG. 3 is a diagrammatic view showing how radiation from a target is focused onto the reticle and detector in the vehicle via the primary and secondary mirrors of the vehicle seeker.

The optical system of the target seeker comprises a folded reflecting telescope, having primary and secondary optical mirrors 18 and 19, whose optical axis coincides with the spin axis of the vehicle and spins with the vehicle about those coinciding axes. Mounted on the back of mirror 19 is a nutation damper 21 which may be of the type disclosed in the aforementioned Patent 2,734,384 or application Serial No. 789,215 and now abandoned. Although the nutation damper is shown for convenience as mounted on mirror 19, it is understood, of course, that it could be supported elsewhere; as, for example, on the vehicle body on the other side thereof. A schematic diagram of the vehicle and seeker is shown in FIG. 3. The optical system, which includes an image chopper or reticle 20 mounted at the focal plane of the telescope for rotation therewith, forms radiation from the target into an image and chops it, producing a pulsed radiation signal. A photodetector cell 22, such as a lead sulfide detector, is mounted directly behind the image chopper 20 and converts the pulsed radiation signal into an alternating current that can be processed by the vehicle's circuitry, hereinafter described.

Figure 4:
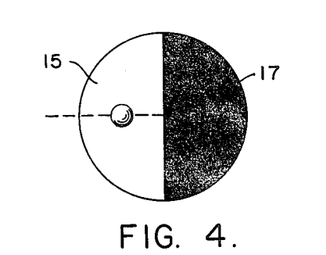
FIG. 4 illustrates the relative position of reticle and target image at the time of maximum current.

The chopper action can be understood by considering a simple image chopper or reticle as shown in FIG. 4. Its surface is divided into two main sectors of 180°. When the telescope forms the image of the target on the wholly clear portion 15 of the reticle, the radiation passes through the reticle and impinges on the detector. When the image falls on the opaque portions 17 of the reticle the radiation is interrupted, and the detector receives no energy.

Figure 5:
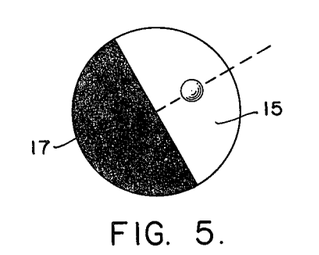
FIG. 5 illustrates an angular position of the reticle relative to the target for maximum current.
Figure 6:
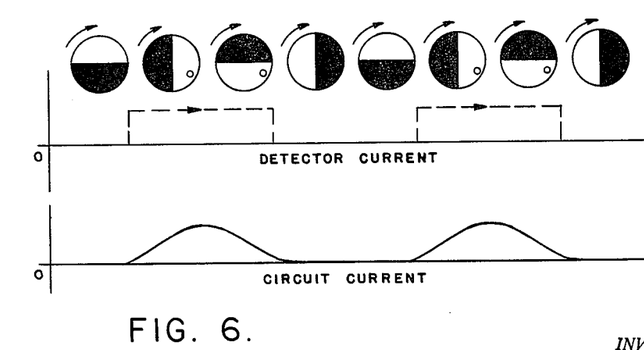
FIG. 6 shows the relationship and form of detector current and circuit current with reticle and target position.

The current from the detector is related to the rotational position of the reticle. Whenever the target image is wholly in the clear portion 15 of the reticle, the circuit current is at maximum. For instance, if the target is to the right of the telescope, the current will be at maximum when the clear part 15 of the reticle is on the left side of the axis, as in FIG. 4. The direction of the target relative to the telescope axis determines the time of occurrence or phase of the maximum current, as in FIG. 5 for instance. Because the electronic circuitry used rounds-off the pulses, the current from the seeker amplifier 14 appears as an undulating line, as shown in FIG. 6. The signal from the detector 22 is amplified by the circuit of FIG. 7, and, still containing both phase and amplitude information, is fed back to the solenoid coil 24 of a solenoid operated valve 26, as shown in FIG. 8, which operates the precessing jet motor 16. Thus the signal produces an alternating field in the solenoid 24 with just the frequency at which the vehicle 10 is spinning.

With the reticle 20 mounted on vehicle 10 the signal frequency is identical with the spin rate of the vehicle. Therefore, the current is automatically and exactly synchronized with the vehicle spin.

The alternating field, synchronized with the vehicle spin acts on the solenoid operated valve 26 and thus the precessing jet 16 and results in a torque on the spinning vehicle proportional to the current in the solenoid coil 24. The spinning vehicle assembly 10, acting like a gyroscope, precesses in response to this alternating field.

Consider the forces on the spinning vehicle. Viewing vehicle 10 of FIGS. 9 and 10 from beyond the target, the vehicle is seen as spinning in a clockwise direction with the target to the left of the spin axis 26 and the target image appearing to the right (FIG. 10). Radiation passing through the clear portion 15 will produce a current which energizes solenoid 24 and activates precessing jet 16. The reaction force from the precessing jet 16, shown as a heavy arrow in FIG. 9, exerts a torque on the vehicle which is felt as a precessing force 90° around in the direction of clockwise rotation and effects a turning of the vehicle so that the spin axis 26 points directly at the target and the target image is centered on the reticle 20.

Figure 9:
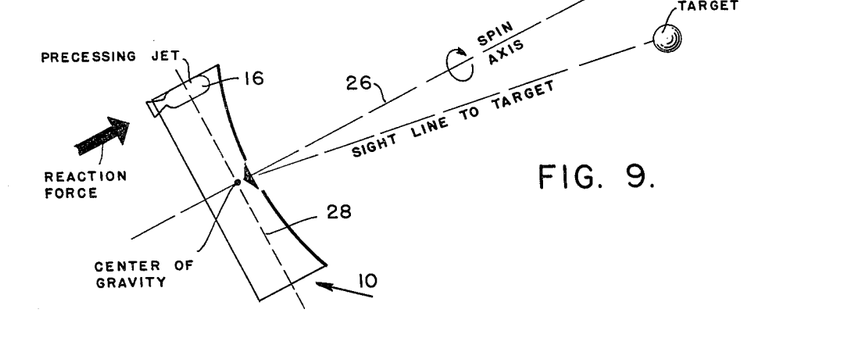
FIGS. 9 and 10 are diagrammatic views of the vehicle showing its direction of spin and illustrating how the reaction force from the precessing jet causes the vehicle to precess, as would a gyroscope, to align its spin axis with the line-of-sight to the target body.
Figure 10:
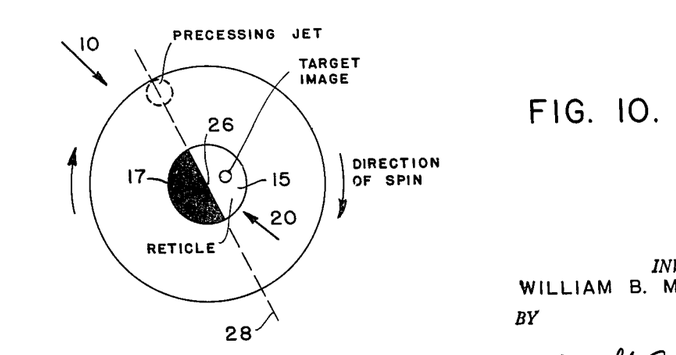

The spinning vehicle, acting like a gyroscope rotating about spin axis 26, thus transforms the torque, produced by the precessing jet 16, about an axis that goes through the center of gravity and normal to the paper into a precession or rotation of spin axis 26 about axis 28 which is perpendicular to and intersects the thrust axis of the precessing jet 16 and intersects the center of gravity of the vehicle 10, as shown in FIGS. 9 and 10. That is, with gyro rotation about a first axis, a torque applied about a second axis will cause the gyro to precess about a third axis, all of the axes being normal to each other. As the current in the solenoid 24 passes through a maximum, operating the valve 26 and thus the precessing jet 16, the torque produced by the thrust of the precessing jet precessing the vehicle and telescope, is maximum. It is only necessary, then, that the reticle 20 have the correct position with respect to the precessing jet 16 for this maximum current to occur at just the right time to produce a torque in the direction of the target.

Because the current is maximum when the target image is in the center of the clear segment 15 of reticle 20, the torque on the vehicle and telescope is in the direction of the target; see FIG. 10. The vehicle acting like a gyroscope responds to this torque by precessing its spin vector (i.e., axis) toward the target. With the telescope axis along the spin vector, the telescope thus rotates toward the target. In this manner the gyro-like spinning vehicle assembly 10 keeps the telescope pointed at the target body.

Figure 11:
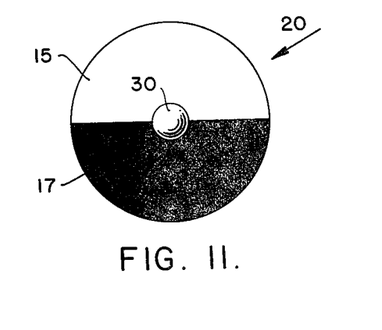
FIG. 11 shows the position of a target image for constant radiation through the reticle.

If the seeker telescope is pointing directly at the target 30, FIG. 11, a constant amount of radiation passes through the reticle 20 at all times; the detector generates no pulsating current; no current flows in the solenoid coil; and the vehicle experiences no precessing torque. The telescope remains pointed in this fixed direction in space, looking at the target, until a change in the bearing angle (line-of-sight to the target) causes the target image 30 to move away from the center of the reticle.

Figures 12, 15:
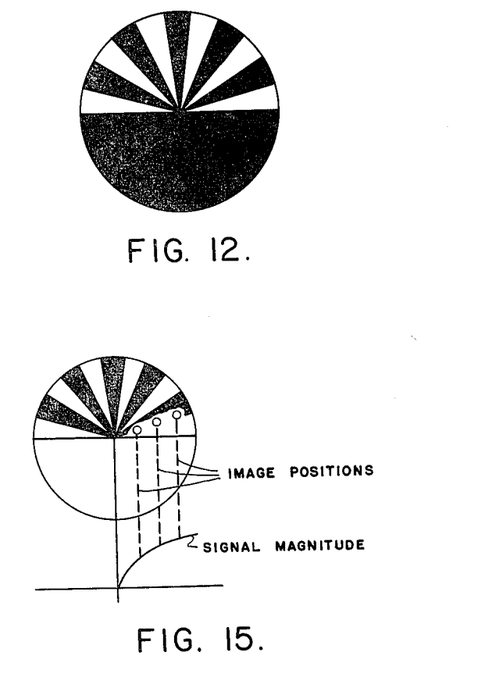
FIG. 12 shows a reticle with alternating clear and opaque sectors on one half, and wholly opaque on the other half thereof.
FIG. 15 illustrates the signal magnitude as affected by position of the target image on the reticle.

As described, the seeker 12 would receive a full tracking signal as soon as the image barely moved off the center of the reticle 20. However, the preferred reticle has alternating clear and opaque sectors, as shown in FIG. 12. This pattern gives the chopping frequency a more convenient value for electronic amplification and reduces background clutter from background radiation. In addition, it makes the tracking signal proportional to the bearing rate.

Figure 13:
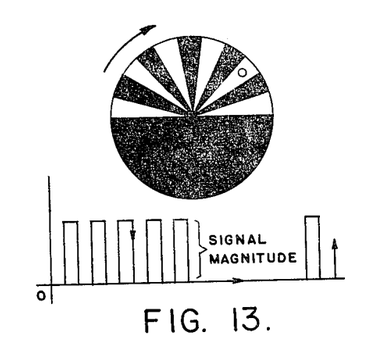
FIG. 13 illustrates the position of a target for maximum current when using the reticle of FIG. 12.

The target image formed on the reticle is not infinitely small. When this target image, in FIG. 13, moves well away from the center of the reticle, the widening pie-shaped sectors alternately completely block the radiation, then permit it all to pass. The pulsating current is then at maximum. FIG. 13 also shows target position for maximum current.

Figure 14:
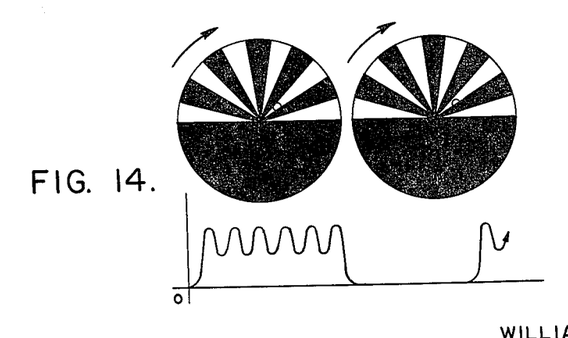
FIG. 14 shows target positions for small current using the reticle of FIG. 12.

If the image nears the center of the reticle, the narrow ends of the pie-shaped sections only partially obscure and partially transmit the image radiation as shown in FIG. 14. The magnitude of the amplified current, as a function of target image position, appears as in FIG. 15. The vehicle will receive smaller precession torques when the image is only slightly off the telescope's center than when the target is well away from the telescope's axis, as shown by the different positions of the target image in FIG. 15.

While the vehicle travels precisely on a course to intercept the target or reach the target destination, by means of a lateral jet 32 hereinafter explained, the telescope will point directly at the target and no signal will result, because the image will be at the null point of the chopper 20.

When the direction to the target changes because of changes in target or vehicle velocity, if any, the target image moves away from the reticle center and creates a tracking signal. The displacement of the image grows until the vehicle's precession rate just equals the sight-line rate of the target. Thus, the seeker telescope mounted on the vehicle reports any changes in the direction of the target that require alteration of the seeker optical axis (i.e., vehicle spin axis) to have it coincide with the line-of-sight from the vehicle to the target. Because the telescope's precession rate depends upon the magnitude of the thrust produced by the precessing jet (current in the solenoid of valve 26 controls the precessing jet), the pressure difference across the jet (which is proportional to the coil current) becomes a direct measure of the bearing rate to the target.

Figures 7, 16:
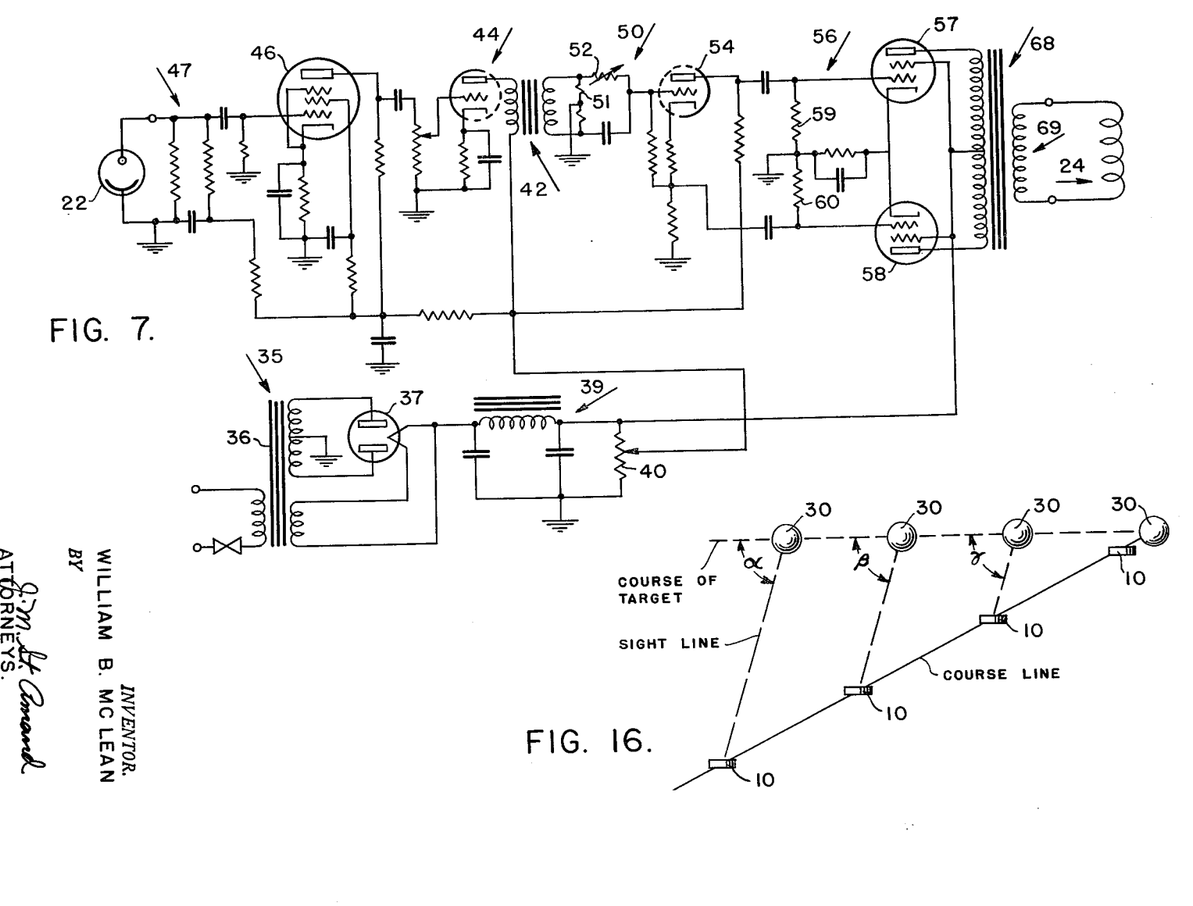
FIG. 7 is a circuit diagram of a seeker amplifier for amplifying signals generated by the photodetector cell.
FIG. 16 illustrates a vehicle traveling in space on a collision course with a target body.
Figure 8:
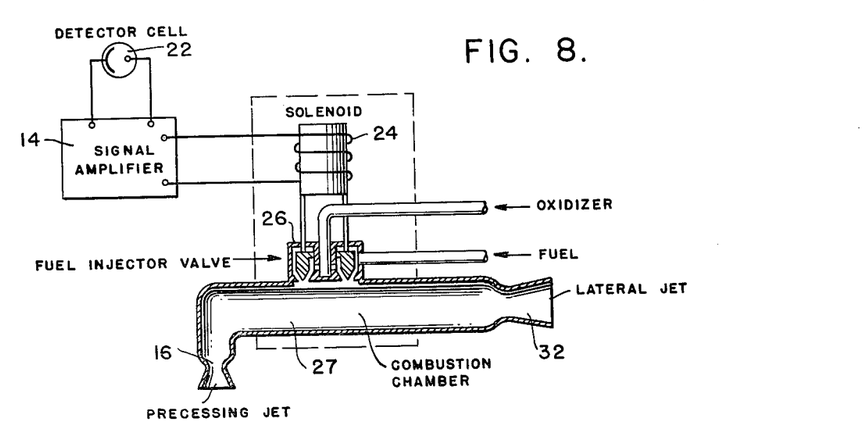
FIG. 8 is a diagrammatic illustration of the circuitry and propulsion system for a preferred embodiment of the present invention.

A space vehicle 10 traveling in space on a collision course with another body 30 moving in space is shown in FIG. 16. With the range between the space vehicle 10 and the other body 30 (e.g., a target planet) closing and the bearing angle remaining constant (i.e., $\alpha = \beta = \gamma$) the vehicle and other body will inevitably collide.

A vehicle of constant speed launched on a collision course with a target body in space moving at a constant speed should maintain a constant bearing to the target body to close the range to zero. The vehicle-to-target bearing must be constant at the end of flight for a collision, and a constant bearing throughout flight will ensue a collision. Since the principles of a collision course are well known in the art, a further discussion on this point is not considered necessary.

To provide a mechanism of establishing a collision course between the space vehicle 10 and a target 30 moving in space, the spinning vehicle must be provided with a lateral acceleration which is in the plane determined by the sequential positions of the sight line from vehicle to target and be of a magnitude proportional to the sight line rate. This can be accomplished by providing the vehicle 10 with a second jet (a lateral jet) 32 whose thrust axis is through the center of gravity of the spinning vehicle, and whose thrust axis is 90° from the thrust axis of the precessing jet as measured around the periphery of the spinning assembly, as shown in FIGS. 1 and 2.

If both the precessing jet 16 and the lateral jet 32 are controlled by a single valve 26, FIG. 8, in such a way that the pressure behind each jet is varied proportional to the incoming target signal from detector 22, then it can be shown that a direct proportionality exists between the sight line rate and the lateral acceleration of the vehicle in space. This is the necessary and sufficient condition for a proportional navigational course which will result in the collision of the vehicle and target bodies.

Referring again to FIG. 7, this figure shows a wiring diagram of an amplifier which amplifies the target signal generated by the photodetector cell 22 and feeds it to solenoid coil 24 which operates valve 26 and thus the jet motors 16 and 32.

The amplifier circuit, shown by way of example, includes a conventional power supply 35 including a transformer 36 having primary and secondary windings and a fullwave rectifier as shown at 37. Associated with the power supply 35 is a filtering network 39 of conventional form supplying a potentiometer 40. Potentiometer 40 supplies power to a phase shift transformer 42, the primary of which is in the plate circuit of an amplifier tube 44. The photocell 22 is connected in the grid circuit of an amplifier tube 46 which is a five element tube having screen and suppressor grids as shown. The input circuit of tube 46 includes photocell 22 and filter circuits 47 to limit the range of frequencies to which the system will be sensitive.

The output of tube 46 is connected to the control grid of tube 44 which controls the primary of transformer 42.

The secondary of transformer 42 connects to a conventional phase shifting circuit network as shown at 50 including a center tapped resistor 51 connected across the secondary and grounded, and a rheostat 52. By adjustment of rheostat 52 the phase of the signal pulses being transmitted can be adjusted. The phase shifting circuit 50 is connected to a phase splitting tube 54, the output of which connects to a push-pull power amplifier circuit 56. Circuit network 56 includes push-pull connected tubes 57 and 58. Numerals 59 and 60 indicate grid resistors.

The power amplifier network 56 is connected to the primary of output transformer 68 and the secondary 69 of this transformer is connected to the solenoid coil 24 which operates valve 26 for the precessing and lateral thrust jets 16 and 32.

By adjusting the variable resistor 52, the phase, or time of occurrence, of the signal pulses from photodetector cell 22 can be adjusted relative to the angular position of the precessing jet 16 about the spin axis 26 of the vehicle so that the direction of precessing is such as to achieve straight line precession of the vehicle in realigning its spin axis 26 with the line-of-sight from the seeker to the target as illustrated in FIGS. 9 and 10. Another method of adjusting the phase relative to the angular position of the precessing jet, as previously described, is by physically orienting the clear and opaque sectors of the reticle about the spin axis with respect to the precessing jet 16.

Referring again to FIG. 8, this figure illustrates how signals generated by photodetector cell 22, from radiation from a target impinging thereon, are amplified by signal amplifier 14 and caused to operate solenoid 24 which in turn actuates a single valve 26. Valve 26 is a fuel injector type valve which feeds correct amounts of fuel and oxidizer, for example, into combustion chamber 27. Both the precessing jet 16 and lateral jet 32 are fed, at equal gas pressures from combustion chamber 27. The passages from combustion chamber 27 to the jet nozzles are large in cross-sectional area with respect to the cross-sectional area of the jets in order that there will be no pressure drop between the combustion chamber and the jet nozzles.

Though the gas pressure at each of the nozzles are equal to each other at all times, the cross-sectional areas of the nozzles are of different sizes in order to establish the proportionality of the lateral acceleration and the sight line rate. Less thrust will usually be necessary to precess the vehicle than will be needed for moving the vehicle on a collision course to eventually collide with a target.

Injector valve 26 is of the type for controlling the quantity of oxidizer and fuel entering the combustion chamber and of acting to shut off the propellant flow completely. With this type of valve the thrust of the jets 16 and 32 can be varied according to the amount of oxidizer and fuel allowed to enter the combustion chamber from the oxidizer and fuel tanks, shown in FIG. 1, in response to current passing through solenoid 24. Injector valve 26 is similar to that disclosed in U.S. Patent 2,810,259 issued October 22, 1957.

It has been presumed that the vehicle is traveling at a forward velocity imparted to it when it was launched on its travel in space. Where additional forward velocity of the vehicle is desired, to that imparted thereto at the time of launch, the lateral jet may be canted back at an angle to give a forward thrust vector as well as the lateral thrust vector. It must be noted, however, that the thrust axis of this jet must pass through the center of gravity of the vehicle.

By properly directing a single jet with respect to the center of gravity of the body in order to generate a pulsating torque equivalent to that of the precessing jet, as previously described, the single jet can be used to achieve the precessing mechanism as well as lateral and forward thrust. The thrust axis from the single jet must pass close to but displaced from the center of gravity of the vehicle by the amount necessary to produce a torque about the center of gravity equal to that previously produced by the precessing jet.

Obviously, many modifications and variations of the present invention are possible in the light of the above teachings. It is therefore to be understood that within the scope of the appended claims the invention may be practiced otherwise than as specifically described.

What is claimed is:

1. In a vehicle capable of traveling in free space while rotating about its central spin axis and having all the properties of a gyroscope, a proportional navigation system comprising seeker means mounted on the spin axis of the vehicle for detecting electromagnetic radiation from a target body and generating electrical signals in response to said radiation, means responsive to the electrical signals generated by said seeker means for operating propulsion means in said vehicle in a manner to precess the vehicle to point its spin axis directly at the target body and to move said vehicle along a collision course with said target body.

2. A device as in claim 1 wherein said seeker means includes a folded reflecting telescope whose optical axis coincides with the spin axis of the vehicle, a reticle mounted at the focal plane of said telescope for rotation therewith and for chopping radiation from the target formed into an image thereon into a pulsed radiation signal, and a photo-detector cell mounted behind said reticle to convert the pulsed radiation signal into an alternating current.

3. In a vehicle capable of traveling in free space while rotating about its central spin axis and having all the properties of a gyroscope, a proportional navigation system comprising seeker means mounted on the spin axis of the vehicle for detecting electromagnetic radiation from a target body and generating electrical signals in accordance with the bearing of the target relative to the spin axis of the vehicle in response to said radiation, means for converting said signals into an alternating current the time of occurrence of which is determined by the target position, means responsive to the electrical signals generated by said seeker means for operating propulsion in said vehicle in a manner to precess the vehicle to point its spin axis directly at the target body and to move said vehicle on a collision course with said target body.

4. A vehicle capable of traveling in free space while rotating about its central spin axis and having all the propeties of a gyroscope, including a proportional navigation system comprising seeker means mounted on the spin axis of the vehicle for detecting electromagnetic radiation from a target body and generating electrical signals in response to said radiation which are in accordance with the bearing of the target relative to the spin axis of the vehicle, means for converting said signals into an alternating curent the time of occurrence of which is determined by the target position, means responsive to these converted electrical signals for operating propulsion means in said vehicle including a small jet on the outer periphery of the spinning vehicle in a manner to precess the vehicle to point its spin axis directly at the target body and a second jet to move said vehicle along a collision course with said target body.

5. A device as in claim 4 wherein said second jet has its thrust axis passing through the center of gravity of the vehicle and said second jet is positioned 90° from the precessing jet as measured around the periphery of the spinning vehicle.

6. A vehicle capable of traveling in free space while rotating about its central spin axis and having all the porperties of a gyroscope, including a proportional navigation system comprising seeker means mounted on the spin axis of the vehicle for detecting electromagnetic radiation from a target body and generating electrical signals in response to said radiation which are in accordance with the bearing of the target relative to the spin axis of the vehicle and the time of occurence of which is determined by the position of the target body thereabout, means responsive to the electrical signals for operating means in said vehicle including a small jet on the outer periphery of the spinning vehicle in a manner to precess the vehicle to point its spin axis directly at the target body and a second jet to move said vehicle on a collision course with said target body.

7. A device as in claim 6 wherein said second jet has its thrust axis passing through the center of gravity of the vehicle and said second jet is positioned 90° about the periphery of the spinning vehicle as measured from the precessing jet.

8. A device as in claim 6 wherein the cross-sectional areas of the nozzles of said jets are of different sizes such as to establish the proportionality between the vehicle's acceleration along a collision course and the precession rate of pointing the vehicle's spin axis directly at the target body.

9. A device as in claim 6 wherein said small jet has a thrust axis which is parallel to the spin axis of the vehicle.

10. A device as in claim 9 wherein the torque produced by thrust from the precessing jet is transformed into a precession of the vehicle's spin axis in a direction perpendicular to both the spin axis and the axis intersecting the center of gravity of the vehicle perpendicular to the thrust axis of the precessing jet.

11. A device as in claim 6 wherein said means responsive to said electrical signals for operating the propulsion means comprises a solenoid operated valve for feeding fuel to a combustion chamber in amounts proportional to and in phase with said electrical signals.

12. A device as in claim 11 wherein said combustion chamber has passages connected therewith to said precessing jet and said second jet for supplying gases of combustion to said jets at equal pressures.

13. A device as in claim 11 wherein said solenoid operated valve is operable to vary the thrust from both said propulsion jets in proportion to said electrical signals.

14. A device as in claim 6 wherein nutation damper means is included therein for stabilization of the vehicle's spin axis.

15. A gyroscopic spinning body for detecting an energy emitting source, said spinning body having an axis of spin, means responsive to energy emitted from said source and providing an output signal repesenting the radial direction of said source with respect to said axis of spin, and precessing means responsive to said output signal for causing said spin axis to approach alignment with said energy emitting source.

16. A gyroscopic spinning body for tracking an energy emitting source, said spinning body having an axis of spin, means responsive to energy emitted from said source carried by said spinning body, means responsive to said first mentioned means for applying a precessing force to said spinning body and causing said spin axis to approach alignment with said energy emitting source.

17. The device of claim 16 wherein said force is an intermittent force applied at a frequency equal to the spin frequency of said spinning body.

18. A spinning body for tracking an energy emitting source, said spinning body acting as a gyro and having an axis of spin, means responsive to energy emitted from said source carried by said spinning body, said means providing an output signal having a frequency equal to the spin frequency of said spinning body, and precessing means responsive to the output signal of said first mentioned means for applying an intermittent force to said spinning body which intermittent force causes said spin axis to approach alignment with said energy emitting source.

19. The device of claim 18 having additional means responsive to the output signal of said first mentioned means for applying an additional intermittent force to said spinning body which additional intermittent force causes motion of said spinning body transverse to said axis of spin.

References Cited by the Examiner

UNITED STATES PATENTS

| | | | |
|---|---|---|---|
| 2,852,208 | 9/58 | Schlesman | 244—14 |
| 2,856,142 | 10/58 | Haviland | 244—14 |
| 2,857,122 | 10/58 | Maguire | 244—14 |
| 2,911,167 | 11/59 | Null | 244—14 |
| 3,028,119 | 4/62 | Coble | 244—14 |
| 3,072,365 | 1/63 | Linscott et al. | 244—14 |

BENJAMIN A. BORCHELT, *Primay Examiner.*

CHESTER L. JUSTUS, SAMUEL FEINBERG,
*Examiners.*

UNITED STATES PATENT OFFICE
CERTIFICATE OF CORRECTION

Patent No. 3,216,674                                  November 9, 1965

William B. McLean

It is hereby certified that error appears in the above numbered patent requiring correction and that the said Letters Patent should read as corrected below.

Column 2, line 44, for "789,215" read -- 789,216 --; line 45, strike out "abandoned, for Spin-Axis Stabilized Space Vehicle struc-" and insert instead -- United States Patent Number 3,034,745, issued May 15, 1962, for Spin-Axis Stabilized Space Vehicle Struc- --.

Signed and sealed this 5th day of September 1967.

(SEAL)
Attest:

ERNEST W. SWIDER                              EDWARD J. BRENNER
Attesting Officer                                  Commissioner of Patents